＃US006959554B1

United States Patent
Shirron et al.

(10) Patent No.: US 6,959,554 B1
(45) Date of Patent: Nov. 1, 2005

(54) PASSIVE GAS-GAP HEAT SWITCH FOR ADIABATIC DEMAGNETIZATION REFRIGERATOR

(75) Inventors: Peter J. Shirron, Hyattsville, MD (US); Michael J. Di Pirro, Silver Spring, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 24 days.

(21) Appl. No.: 10/192,886

(22) Filed: Jul. 10, 2002

Related U.S. Application Data
(60) Provisional application No. 60/303,797, filed on Jul. 10, 2001.

(51) Int. Cl.[7] ................ F25B 21/00; F25B 19/00; F28F 27/00
(52) U.S. Cl. ................ 62/3.1; 62/51.1; 165/275
(58) Field of Search .................. 62/3.1, 51.1; 165/275

(56) References Cited

U.S. PATENT DOCUMENTS

| | | | | |
|---|---|---|---|---|
| 4,541,249 A | * | 9/1985 | Graves et al. | 62/55.5 |
| 4,771,823 A | * | 9/1988 | Chan | 165/61 |
| 5,379,601 A | * | 1/1995 | Gillett | 62/51.1 |
| 5,676,205 A | * | 10/1997 | White | 165/275 |
| 5,842,348 A | | 12/1998 | Kaneko et al. | |

FOREIGN PATENT DOCUMENTS
JP 03-025270 A * 2/1991

OTHER PUBLICATIONS
Shirron, et al., Passive Gas–Gap Heat Switches for Use in Adiabatic Demagnetization Refrigerators, Cryogenic Eng. Conf., Jul. 16–20, 2001.
Smith, et al., A 3 He Gas Heat Switch for Use in a Cyclic Magnetic Refrigerator, J. of Low Temp. Physics, vol. 119. Nos. 3/4 2000, p. 507–14.
Shirron, et al., A Multi–Stage Continuous–Duty Adabatic Demagnetization Refrigerator, Cryogenic Eng. Conf., Jul. 13–16, 1999.

* cited by examiner

*Primary Examiner*—William C. Doerrler
(74) *Attorney, Agent, or Firm*—Diana M. Cox

(57) ABSTRACT

A passive gas-gap heat switch for use with a multi-stage continuous adiabatic demagnetization refrigerator (ADR). The passive gas-gap heat switch turns on automatically when the temperature of either side of the switch rises above a threshold value and turns off when the temperature on either side of the switch falls below this threshold value. One of the heat switches in this multistage process must be conductive in the 0.25° K to 0.3° K range. All of the heat switches must be capable of switching off in a short period of time (1–2 minutes), and when off to have a very low thermal conductance. This arrangement allows cyclic cooling cycles to be used without the need for separate heat switch controls.

32 Claims, 4 Drawing Sheets

PASSIVE GAS-GAP HEAT SWITCH FOR ADIABATIC DEMAGNETIZATION REFRIGERATOR

CROSS-REFERENCE TO RELATED APPLICATION

Priority is claimed under 35 U.S.C. § 119(e) from U.S. Provisional Patent Application No. 60/303,797 filed on Jul. 10, 2001.

ORIGIN OF THE INVENTION

The invention described herein was made by employees of the United States Government, and may be manufactured and used by or for the Government for government purposes without the payment of any royalty thereon or therefore.

TECHNICAL FIELD

This invention relates generally to refrigeration heat switches and more particularly to a heat switch used for adiabatic refrigeration devices.

BACKGROUND OF THE INVENTION

Heat switches are needed to control the heat flow between adjacent stages in an Adiabatic Demagnetization Refrigeration (ADR) process. Heat switches are typically one of two types: those that use a metallic switching element and those that use a gas or fluid switching element. The heat switches that use a metallic switching element are typically mechanical, super conducting or magnetoresistive switches. Heat switches that use a gas as the switching element are called gas-gap switches. The concept is to place two conductive metal plates close to each other and introduce a gas between them to turn the switch On, and remove the gas to turn the switch Off. One of the disadvantages of all of the aforementioned switches is the need for some sort of actuator. Not only does this require ancillary control electronics, software and sensors, these requirements may have a significant thermal impact on the system. Actuators require wiring or drive shafts which conduct heat and dissipate heat when used. This could be a concern when operating in a cryogenic environment.

An ADR stage produces cooling (or heating) by the interaction of a magnetic field with the magnetic spins in a paramagnetic salt. Magnetizing the salt produces heating, and demagnetizing the salt produces cooling. A conventional "single-shot" ADR consists of a "salt pill" containing the magnetic salt, a superconducting magnet, and a heat switch. The salt pill is located in the bore of the magnet, and the heat switch links it to a heat sink. Regardless of the initial conditions, the refrigeration cycle consist of the following steps: First, the salt pill is magnetized, causing it to warm up. Second, when its temperature exceeds that of the heat sink, the heat switch is powered into the on state. Third, the salt continues to be magnetized, generating heat which flows to the sink. This continues until full field is reached, which necessarily is strong enough to significantly align the spins and suppress the entropy of the salt. Fourth, at full magnetic field, the heat switch is deactivated to thermally isolate the salt from the heat sink. Fifth, the salt is demagnetized to cool it to the desired operating temperature. In general, the salt will then be receiving heat from components parts. The heat is absorbed and operating temperature maintained by slowly demagnetizing the salt at just the right rate. Heat can continue to be absorbed until the magnetic field is reduced to zero, at which point the ADR has run out of cooling capacity.

Over the last few years there has been a growing need for more advanced ADR cooling technology. The space industry has been a pioneer in this technology because ADRs are the only low temperature (below 0.2° K) refrigeration technology that does not use any fluids, and therefore does not have the design constraints imposed by gravity. Recently ADRs have been developed for commercial use particularly in the high resolution, high efficiency, x-ray spectrometer industry. The trend in developing ADRs is toward using multiple cooling stages as this arrangement allows for greater efficiency, by reducing parasitic heat flows within the refrigerator, and greater operating temperature range. In this process each stage is thermally connected to the next via a heat switch. Thus, for low temperature ADR systems there exists a need for a heat switch that is capable of conducting heat at sub-Kelvin temperatures (down to approximately 200 mK) and is capable of being turned off at those temperatures. Existing gas-gap switches that use a getter to remove the conductive gas from the switch body cannot meet the latter requirement. As the benefits of using ADRs become more widely known it is anticipated that a wider array of industries will take advantage of this efficient cooling process.

The present invention, in a more general application, provides an easy way to cool something below room temperature and then automatically thermally isolate it at a low temperature. This is made possible by providing a heat switch that is capable of conducting heat at temperatures ranging from 0.25° K to above room temperature. One of the heat switches in this multistage process must be conductive in the 0.25° K to 0.3° K range. All of the heat switches must be capable of switching Off in a short period of time (1–2 minutes), and when Off to have a very low thermal conductance. Currently, no heat switches are capable of meeting these requirements. Superconducting switches have too much conductance in the Off state. Mechanical heat switches have too little conductance in the On state. Finally, traditional getter-activated gas-gap heat switches have long turn-off times. Thus there is a need in the industry for a passive gas-gap heat switch that can facilitate the heating/cooling of a device in the 0.25° K to above 1° K range in a manner such that the heat switch does not require long turn-off times.

SUMMARY OF THE INVENTION

Accordingly, it is an object of the present invention to provide an improvement in a passive gas-gap heat switch for use in an ADR environment.

It is another object of the invention to provide a passive gas-gap heat switch that can cool a device below room temperature.

It is a further object of this invention to provide a passive gas-gap heat switch that is capable of conducting heat at temperatures ranging from 0.25° K to above 1° K.

It is yet a further object of the present invention to provide a passive gas-gap heat switch that does not require a long turn-off time.

It is still a further object of the present invention to provide a passive gas-gap heat switch that has very low thermal conductance when turned off.

It is yet another object of the present invention to provide a passive gas-gap heat switch that can automatically thermally isolate a device once it is cooled down to liquid helium temperature.

The foregoing and other objects of the present invention are achieved by providing a passive gas-gap heat switch in an adiabatic refrigeration environment wherein the heat switch becomes thermally conductive (turns on) when the temperature of either side of the switch rises above a threshold value, and rapidly turns off if either side of the switch falls below the threshold value. This arrangement allows cyclic cooling cycles to be used without the need for separate heat switch controls.

BRIEF DESCRIPTION OF DRAWINGS

The following detailed description of the invention will be more readily understood when considered together with the accompanying drawings wherein.

DETAILED DESCRIPTION OF THE INVENTION

To those skilled in the art, many modifications and variations of the present invention are possible in light of the teachings contained herein. It is therefore to be understood that the present invention can be practiced otherwise than as specifically described by these teachings and still be within the spirit and scope of the claims.

Figure 1:
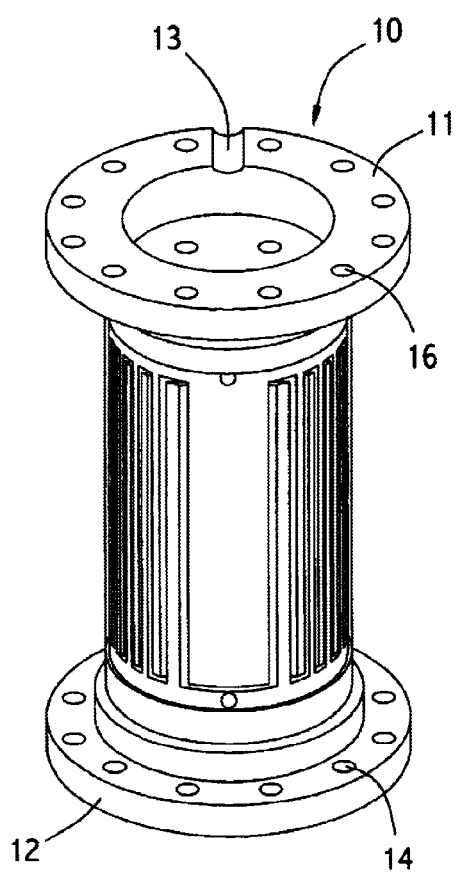
FIG. 1 is an isometric view generally illustrative of the passive gas-gap heat switch of the present invention.
Figure 2:
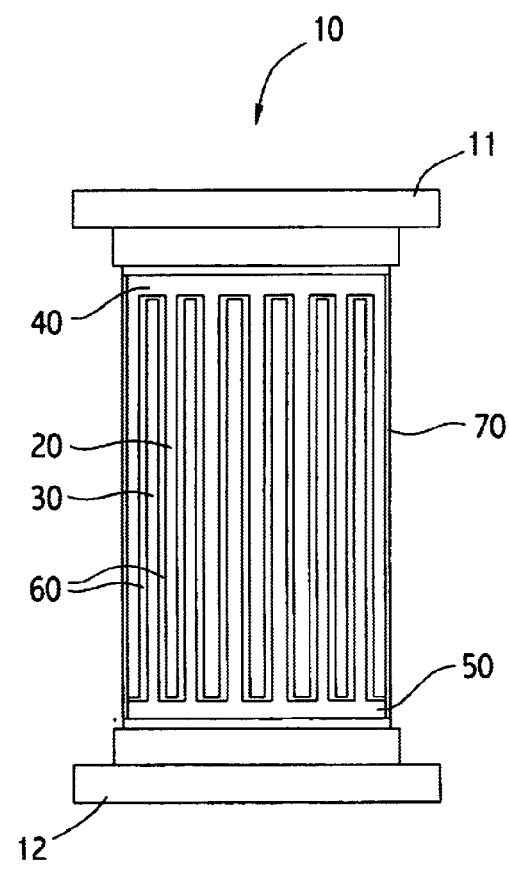
FIG. 2 is a cross-sectional view of FIG. 1.

Referring now to the drawings and more particularly to FIGS. 1 and 2 which show passive gas-gap heat switch 10. Heat switches that use a gas to complete a thermal circuit are called gas-gap switches. The concept is to place two conductive surfaces close to each other and introduce a gas (not shown) between them to turn the switch On, and remove the gas to turn the switch Off. Prior art switches use a getter to move the gas into and out of the switch. A getter is a material that will strongly absorb the gas below a threshold temperature. Common getter materials include zeolite and charcoal. The present invention, heat switch 10, consist of fewer parts and its operation is simpler than the getter actuated switched. Heat switch 10 includes thermal/mechanical interfaces 11 and 12, copper conductors 40 and 50 which include multiple fins 20 and 30 respectively, a small gap 60 (FIGS. 3 and 4) located between each of the fins 20 and 30 of conductors 40 and 50 respectively. Thermal/mechanical interfaces 11 and 12 include bolt holes 14 and 16 which facilitate the physical and thermal connection of heat switch 10 with components (not shown) to be heated or cooled. Conductors 40 and 50 are contained within containment tube 70 that physically supports and aligns the conductors 40 and 50.

Figure 3:
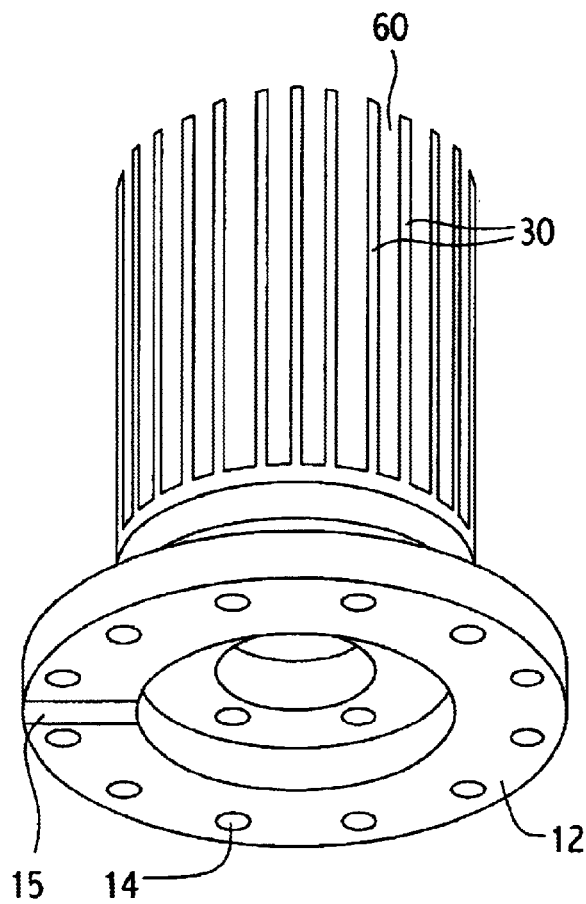
FIG. 3 is illustrative of a conductor component of the passive gas-gap heat switch of the present invention.
Figure 4:
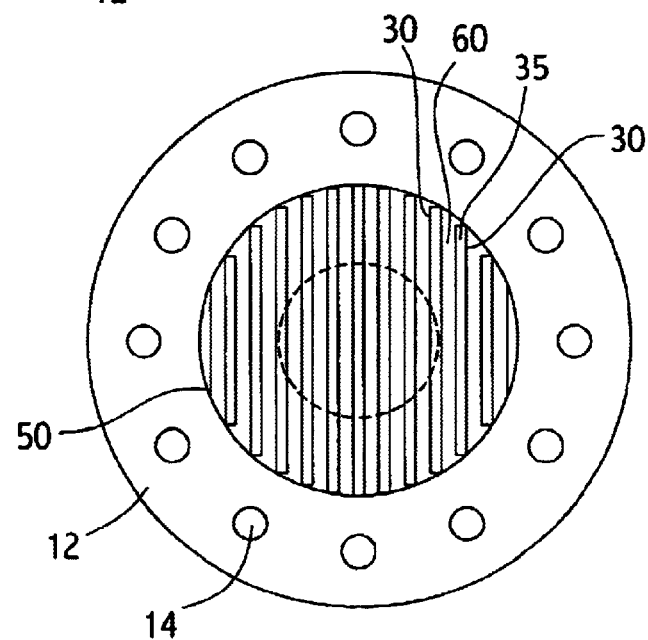
FIG. 4 is illustrative of an axial view of FIG. 3.

Now referring to FIGS. 3 and 4 of the present invention. FIG. 3 shows conductor 50 which includes fins 30 and thermal/mechanical interface 12. Fins 20 and 30 are the means by which heat is transferred from the gas to thermal/mechanical interfaces 11 and 12 respectively. The thermal conductance in the On state is proportional to the surface area 35 of the fins 30 and the thermal conductivity of the gas which is approximately proportional to the gas pressure. Therefore, any means of increasing the conducting surface area 35 of the fins 30 and the conducting surface area 25 of fins 20 will increase the effectiveness of the transfer of heat to and from conductors 40 and 50. A wire electric discharge machining (EDM) technique is used to machine conductors 40 and 50 so as to achieve a very large fin surface area and uniform spacing of gap 60 which is located between fins 20 and 30. The conductors 40 and 50 are cut from a single cylinder of material using the EDM technique. Copper may be used as it provides properties that are desirable for conducting heat. After machining, fins 20 and 30 remain attached to conductors 40 and 50 respectively. The number of fins 20 and 30 and their dimensions are a consideration in the design of heat switch 10. Increasing the number of fins 20 and 30 and their surface areas 25 and 35 respectively will, in general, increase the On conductance of switch 10. But if fins 20 and 30 become too thin, their reduced ability to carry heat may actually reduce the On conductance. The thermal properties of copper and the helium gas used will dictate the optimal number of fins 30 and 40 for the width of gap 60. The width of gap 60 is determined by two factors. First, the ability to reliably assemble heat switch 10 without any of the interleaved fins 20 and 30 contacting each other. As fins 20 and 30 are formed by the wire EDM process, stresses within the material will cause them to bend along their length by an amount that depends on the cube of their thickness. Gap 60 therefore should be larger than the maximum bending that will occur. Second, it is important for heat switch 10 to operate in a regime where the thermal conductance of the gas is pressure dependent. This regime is known as the molecular region and is characterized by the mean free path of the gas being larger than the physical dimensions of the space it occupies. In a passive gas-gap switch, that dimension is the gap width. Since the gas pressure in the switch is engineered to be strongly temperature dependent, operating in the molecular region results in the thermal conductance of the switch being strongly temperature dependent. For the low and higher temperature versions of the passive gas-gap switch, the strong temperature dependence of gas pressure is derived from two different mechanisms. For the low temperature switch, the attractive force between helium-3 atoms causes them to condense rapidly out of the gas phase as the temperature drops below about 0.3° K. This happens regardless of the amount of helium present. For the higher temperature heat switches, the attractive force between helium atoms and the internal components of the switch causes the helium to bind (i.e., adsorb) to those surfaces as the temperature drops. As long as the amount of helium present is less than the amount that would form a single atomic layer, there will be a threshold temperature in the 1–5° K range where the vapor pressure of the helium is strongly dependent on temperature. This threshold depends on the amount of helium present and the type of surface used. Thus this switch can be tailored to passively turn on and off over a range of temperatures.

Figure 5:
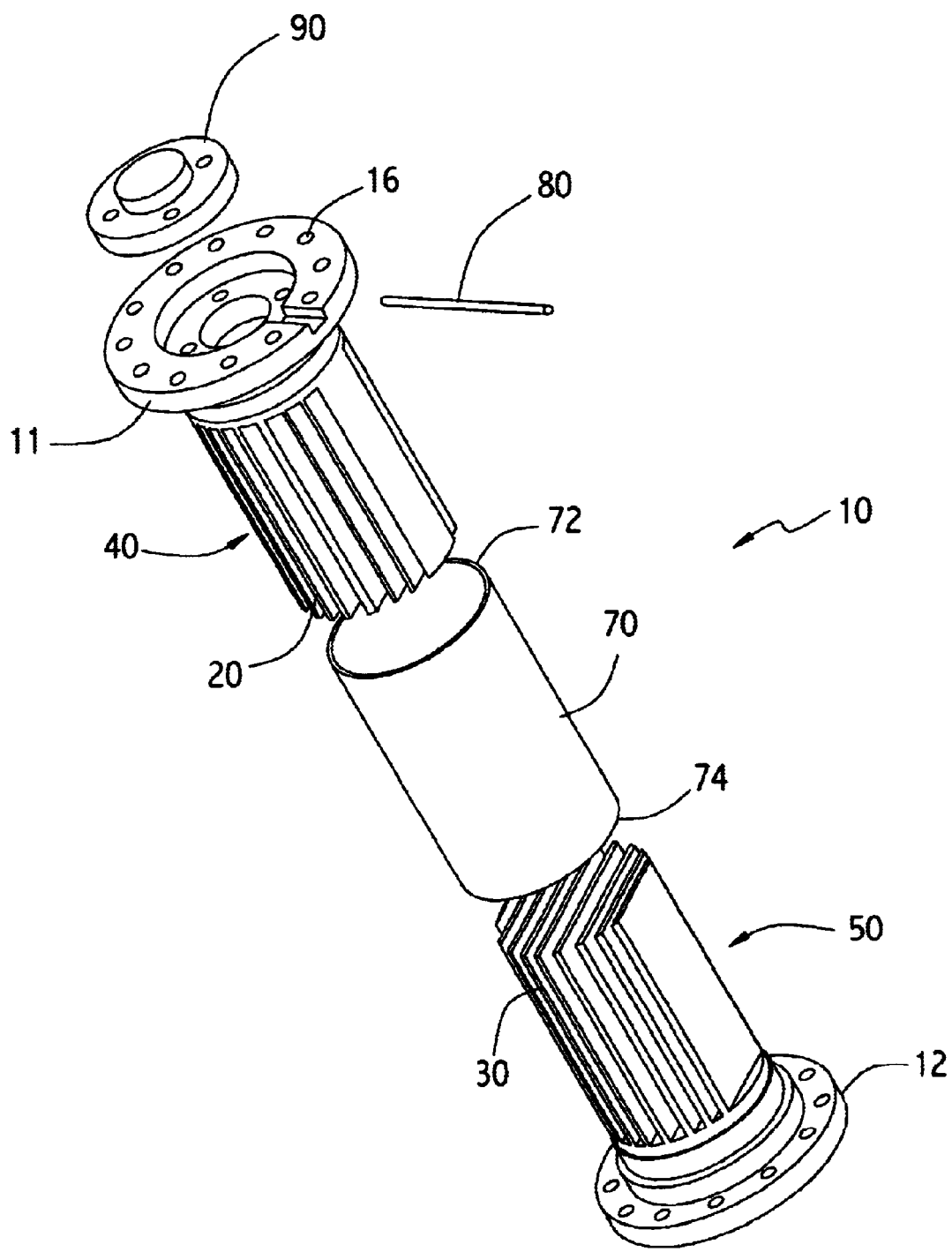
FIG. 5 is an exploded view of FIG. 1.

Now referring to FIG. 5, fins 20 of conductor 40 are inserted into end 72 of containment tube 70 and fins 30 of conductor 50 are inserted into end 74, the opposite end of containment tube 70. Containment tube 70 is rigid and holds conductors 40 and 50 together such that fins 20 and 30 interleave but do not touch. Containment tube 70 must be capable of providing low thermal conductivity, high strength and it must be impermeable to the gas (not shown) that is used as the conducting agent. The low thermal conductivity is required because containment tube 70 still conducts heat between the two ends 72 and 74 which contact thermal/mechanical interfaces 11 and 12 of conductors 40 and 50 respectively, when the switch is in the Off state. This heat flow is undesirable and should be as low as possible. The high strength is necessary because containment tube 70 physically supports conductors 40 and 50. It is important that fins 20 and 30 of conductors 40 and 50 not touch and that the gap 60 remain intact. Since some small mechanical loads may result from how the heat switch 10 is attached to other components (not shown), containment tube 70 must have enough strength to absorb these loads without distorting fins 20 and 30. Impermeability is required because the gas (not shown) must not leak over time or the heat switch 10 will be inoperable. There are several options one can consider for meetings these requirements. In the present invention two different materials are used to meet these requirements. One material provides structural support and the other provides a surface that is impermeable by the gas (not shown). Both materials must have low thermal conductance. Containment tube 70 is attached to conductors 40 and 50 so as to create a hermetic seal. The hermetic seal may be achieved via an epoxy or an indium seal. A small access tube 80 is soldered into end cap 90 to allow heat switch 10 to be evacuated and filled with the appropriate amount of gas (not shown). End cap is sealed onto thermal/mechanical interface 11 in such a way as to be removable and replaceable. Helium 3 gas is used in the present invention as this gas is most suitable at temperatures below 0.7° K and without regard to orientation (presence of gravity). The total volume of liquid helium required for the switch is small because the saturated vapor pressure in liquid helium is a few atomic layers thickness on most substrates. This is also important because a thin film on the substrate will not sag or drip in the presence of gravity. Helium 3 on a copper substrate has a binding energy of 0.4 Pa at about 57° K and a binding energy of only $2.7 \times 10^{-4}$ Pa at 3° K. Different materials have different binding energies and may be used according to need.

In operation the system consists of multiple stages connected in series between the cold end and the heat sink. Each stage consists of a magnet, salt, and heat switch to thermally connect it to the next higher stage (or the heat sink). The number of stages needed depends on how warm the heat sink is, and on the thermal characteristics of the heat switches. In the present invention four stages are used because the desired heat sink temperature is 4–10° K (absolute temperature).

Figure 6A:
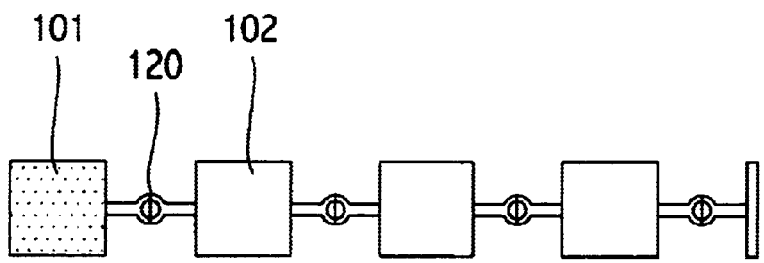
FIGS. 6a–6e are illustrative of the heating and cooling stages of a continuous adiabatic demagnetization refrigeration process.

Now referring to FIGS. 6a–6e, in FIG. 6a, the first stage 101 absorbs heat from the apparatus (not shown) and is slowly demagnetized to maintain constant temperature. When the magnetic field drops to some lower threshold, rather than magnetize it to warm it up (as is done for single-shot ADRs), the second stage 102 is demagnetized to a slightly lower temperature and then the heat switch 120 between the first and second stages 101 and 102 is activated. The system is designed so that the flow of heat from stage 101 to 102 exceeds the heat load from the apparatus, so there is a net flow of heat out of the first stage. Conceptually there is no problem with this: the first stage 101 merely needs to be magnetized now to maintain constant temperature.

Figure 6B:
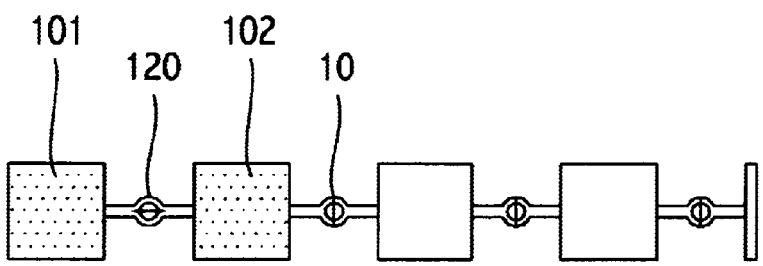

In FIG. 6b the second stage 102 is receiving this heat, so it is demagnetized while the first stage 101 is magnetized. When the magnetic field of the first stage 101 reaches an upper threshold, the heat switch 120 is deactivated and the first stage 101 is demagnetized because the heat flow out has ceased and there is a net heat flow into the stage. The important feature here is that the temperature control system 130 automatically magnetizes or demagnetizes the first stage 101, so this process of recycling the first stage 102 "on the fly" does not involve a loss of temperature control.

Figure 6C:
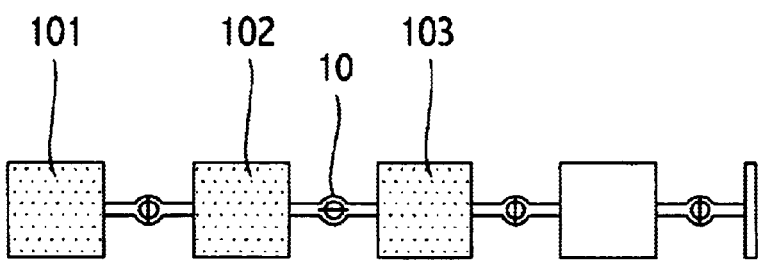

In FIG. 6c, after recycling the first stage 101, the second stage 102 is magnetized to a higher temperature and the third stage 103 is demagnetized to a slightly lower temperature. The temperatures are chosen based on a number of factors, including the thermal conductance of the heat switch 10 and parasitic heat flow to the lower stages. In the present invention, the passive gas-gap heat switch 10 is used to connect the second and third stages 102 and 103 respectively, so the temperatures are dictated almost entirely by the dependence of the thermal conductance on temperature. Passive operation turns out to be possible because the thermal conductance of the switch drops off extremely rapidly below 0.2 K. (This is due to the particular properties of helium-3 which is the gas used inside the switch). The recycling process consists of magnetizing the second stage 102 to about 0.275° K and the third stage to about 0.25° K. Heat will flow from the second stage 102 to the third stage 103, requiring the second stage 102 to be magnetized and the third stage 103 to be demagnetized to maintain these temperatures. Magnetization of the second stage 102 is stopped once the second stage 102 hits its upper field threshold. The second stage 102 is then allowed to cool down some before demagnetization begins. As it cools below the third stage 103 some heat flows from stage 103 to stage 102 which is not beneficial, but this quickly diminishes as the second stage cools below the 0.2° K mark and the heat switch passively turns off (i.e. stops conducting heat). Once it cools below 0.15° K, the passive gas-gap heat switch 10 is completely off, and then the third stage 103 is warmed and recycled.

Figure 6D:
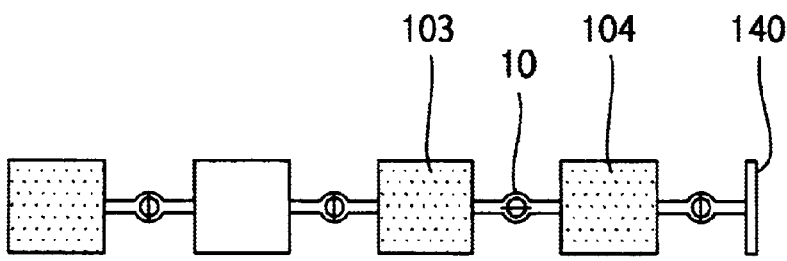
Figure 6E:
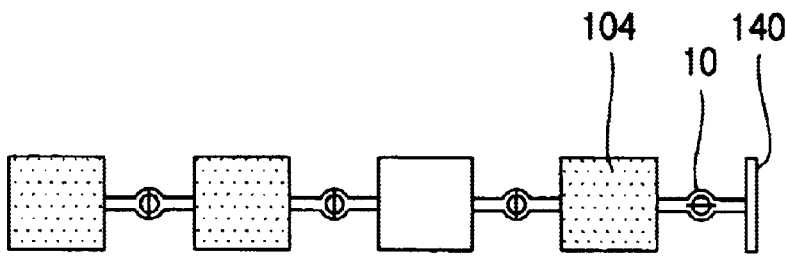

In FIG. 6d the process is essentially the same: The third stage 103 is magnetized to a higher temperature and the fourth stage 104 is demagnetized to a slightly lower temperature and the heat switch between the two stages is activated. The third stage 103 will continue to be magnetized and the fourth stage 104 is demagnetized as heat flows from stage 103 to 104. Again, once the stage 103 hits its upper field threshold, the heat switch 10 is deactivated. Stage 103 can be cooled and stage 104 warmed up to dump its heat to the heat sink 140 via heat switch. This whole process is then repeated to keep transferring heat from the first stage 101. The time required is on the order of 1 hour. The faster it can be done, the more heat we can absorb at the first stage. In practice we can speed things up by having two recycling events occurring at the same time (i.e. stage 101 transfers heat to stage 102 while stage 103 transfers heat to stage 104).

Helium-3 refrigerators typically cool down to about 0.3° K, while better designs can cool to 0.25° K or a little lower. This is precisely the temperature required for the third stage during the recycling operation. The steep drop in the vapor pressure of helium-3 below 0.2° K prevents helium-3 refrigerators from cooling much below 0.25° K, and it causes the thermal conductance of the passive gas-gap heat switch to drop off precipitously. Therefore an alternate use for the passive gas-gap heat switch is to connect two ADR stages to a helium-3 refrigerator. For laboratory systems, helium-3 refrigerators can be quite inexpensive, so a hybrid system could be very attractive for its low cost.

To those skilled in the art, many modifications and variations of the present invention are possible in light of the teachings contained herein. It is therefore to be understood that the present invention can be practiced otherwise than as specifically describe by these teachings and still be within the spirit and scope of the claims.

We claim:

1. A heat switch for a refrigeration process wherein said heat switch comprises;

a first conductor element;

a first set of fins connected with said first conductor element;

a second conductor element;

a second set of fins connected with said second conductor element;

a containment tube for physically supporting said first and second conductor elements; and adsorption means within the containment tube for continuously varying said heat switch on/off temperature over a range of temperatures.

2. The device according to claim 1 wherein said first and second sets of fins are interleaved.

3. The device according to claim 1 wherein a gap exists between said first and second sets of fins.

4. The device according to claim 3 wherein said first and second conductor elements each include a thermal interface.

5. The device according to claim 4 wherein said first and second conductor elements each include a mechanical interface.

6. The device according to claim 5 wherein said thermal interface and said mechanical interface are one in the same.

7. The device according to claim 1 wherein said containment tube is impermeable to helium gas.

8. The device according to claim 7 wherein said containment tube is hermetically sealed with said first and second conductor elements.

9. The device according to claim 1 wherein said refrigeration process is a continuous adiabatic refrigeration process.

10. The device according to claim 9 wherein said heat switch is a passive gas-gap heat switch.

11. The device according to claim 1 wherein said heat switch is capable of conducting heat from 0.25° K to above 1° K.

12. A passive gas-gap heat switch for a continuous adiabatic refrigeration process wherein said heat switch comprises;

a first conductor element;

a first set of fins integrally formed with said first conductor element;

a second conductor element;

a second set of fins integrally formed with said second conductor element wherein said first and second sets of fins are interleaved and do not touch;

a containment tube for physically supporting said first and second conductor elements wherein said containment tube hermetically seals said first and second sets of fins; and adsorption means for continuously varying said heat switch on/off temperature over a range of temperatures.

13. The heat switch as claimed in claim 1, wherein the adsorption means is a helium adsorption means.

14. A heat switch comprising;

a thermally conductive gas, the gas having a mean free path;

a first conductor element;

a first set of fins connected to said first conductor element;

a second conductor element;

a second set of fins connected to said second conductor element; and a hermetically sealed containment tube for physically supporting said first and second conductor elements, wherein the heat switch operates in a molecular region where thermal conductance of the gas is pressure dependent and the gas pressure in the heat switch is temperature dependent resulting in the thermal conductance of the heat switch being strongly temperature dependent at varying on/off temperatures over a range of temperatures.

15. The heat switch as claimed in claim 14 further comprising a gap between said first and second sets of fins, said gap being larger than the mean free path of the gas.

16. The heat switch as claimed in claim 15, wherein the gap is larger than maximum bending of the first and second set of fins.

17. The heat switch as claimed in claim 14, wherein attractive forces between gas atoms cause the gas to bind to the surfaces of the first and second conductor elements within the containment tube such that varying the gas pressure changes the on/off temperature of the heat switch.

18. The heat switch as claimed in claim 14, wherein the heat switch on/off temperatures vary from about .25 degrees Kelvin to about 10 degrees Kelvin.

19. The heat switch as claimed in claim 16, wherein the gas is a helium gas.

20. The heat switch as claimed in claim 18 wherein the helium gas is helium-3.

21. The heat switch as claimed in claim 14, wherein surface area of the first and second set of fins is maximized due to the thermal conductance of the gas being proportional to the surface area of the first and second set of fins when the heat switch is on.

22. The heat switch as claimed in claim 14, wherein the heat switch is a passive switch and operates absent external sorption means.

23. The heat switch as claimed in claim 14, wherein response time is rapid at the on/off temperature.

24. A heat switch comprising;

a gas;

a first conductor element;

a first set of fins connected to said first conductor element;

a second conductor element;

a second set of fins connected to said second conductor element; and a containment tube for physically supporting said first and second conductor elements, the heat switch operation relying on adsorption of the gas within the containment tube to continuously vary the heat switch on/off temperature over a range of temperatures.

25. The heat switch as claimed in claim 24, wherein varying the gas pressure changes the on/off temperature.

26. The heat switch of claim 24 wherein the on/off temperatures range from about 0.25° K to about 10 degrees Kelvin.

27. The heat switch as claimed in claim 24 wherein the gas is helium-3.

28. The heat switch as claimed in claim 24, wherein on/off temperature operates at a rapid response time.

29. A heat switch comprising;

a thermally conductive gas, the gas having a mean free path;

a first conductor element;

a first set of fins connected to said first conductor element;

a second conductor element;

a second set of fins connected to said second conductor element; and a containment tube for physically supporting said first and second conductor elements; and a gap between said first and second sets of fins, said gap being larger than the mean free path of the gas.

30. A heat switch for use in a continuous refrigeration process wherein said heat switch comprises;

a gas;

a first conductor element;

a first set of fins connected to said first conductor element;

a second conductor element;

a second set of fins connected said second conductor element;

a containment tube for physically supporting said first and second conductor elements wherein said containment tube hermetically seals said first and second sets of fins;

a first and a second refrigerator stage, the heat switch operating at a first on/off temperature for the first refrigerator stage and the heat switch operating at a second on/off temperature for the second refrigerator stage, wherein the first on/off temperature is lower than the second on/off temperature and the gas is the same gas at a different pressure.

31. The heat switch as claimed in claim 30, wherein the first on/off temperature is about .25 degrees Kelvin and the second on/off temperature is about 1 degree Kelvin.

32. The heat switch as claimed in claim 30, wherein the heat switch is a passive gas-gap heat switch.

* * * * *

UNITED STATES PATENT AND TRADEMARK OFFICE
CERTIFICATE OF CORRECTION

| | | |
|---|---|---|
| PATENT NO. | : 6,959,554 B1 | Page 1 of 1 |
| APPLICATION NO. | : 10/192886 | |
| DATED | : November 1, 2005 | |
| INVENTOR(S) | : Shirron et al. | |

It is certified that error appears in the above-identified patent and that said Letters Patent is hereby corrected as shown below:

Title Page
Please insert (*) Notice: Subject to any disclaimer, the term of this patent is extended or adjusted or adjusted under 35 U.S.C. 154(b) by 0 days. Please delete 24 days.

Signed and Sealed this

Twenty-ninth Day of May, 2007

JON W. DUDAS
*Director of the United States Patent and Trademark Office*